United States Patent [19]

Katagiri et al.

[11] 4,366,744
[45] Jan. 4, 1983

[54] BRAKE BOOSTER

[75] Inventors: Masayoshi Katagiri, Toyota; Osamu Ogura, Nagoya, both of Japan

[73] Assignees: Toyota Jidosha Kogyo Kabushiki Kaisha; Aisin Seiki Kabushiki Kaisha, both of Aichi, Japan

[21] Appl. No.: 192,200

[22] Filed: Sep. 30, 1980

[30] Foreign Application Priority Data

Nov. 29, 1979 [JP] Japan .................... 54-154654

[51] Int. Cl.³ .......................................... F15B 9/10
[52] U.S. Cl. .......................... 91/369 A; 91/369 B
[58] Field of Search ............ 91/369 A, 369 B, 369 R, 91/376 R; 60/552, 554

[56] References Cited

U.S. PATENT DOCUMENTS

| | | | |
|---|---|---|---|
| 2,894,490 | 7/1959 | Ingres | 91/369 B |
| 3,661,054 | 5/1972 | Brown | 91/369 B |
| 4,192,220 | 3/1980 | Tateoka | 91/369 B |
| 4,242,943 | 1/1981 | Nakamura et al. | 91/369 A |

FOREIGN PATENT DOCUMENTS 2027144 2/1980 United Kingdom ............ 91/369 B

*Primary Examiner*—Paul E. Maslousky
*Attorney, Agent, or Firm*—Stevens, Davis, Miller & Mosher

[57] ABSTRACT

A brake booster of stroke-enlarging type wherein the brake feeling is improved. The brake booster includes a casing, a power piston disposed in said casing so as to divide the interior of the casing into two chambers for being actuated by the pressure difference in the two chambers, and a control piston having a built-in control valve for controlling the pressure difference due to the operation of an input member. The power piston is so disposed as to be relatively movable for a predetermined distance with respect to the control piston and able to be advanced at the initial stage of the braking operation relative to the control piston at a stroke, independently of the amount of advancement of the input member, for the predetermined distance in order to give an output member a larger output stroke than stroke input. At least on one of the mutual abutting surfaces abutting to each other for restricting the end position of the relative movement for the predetermined distance of the power piston to the control piston a shock-absorbing member of rubber material is fixed.

6 Claims, 6 Drawing Figures

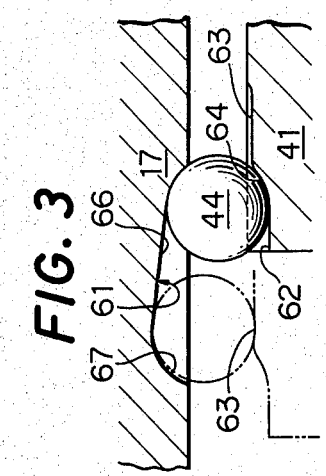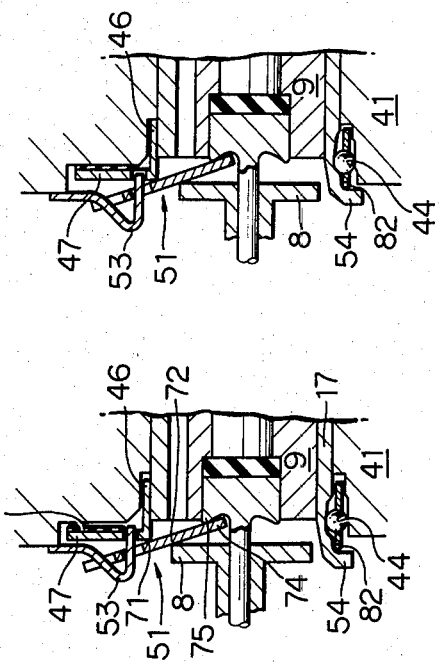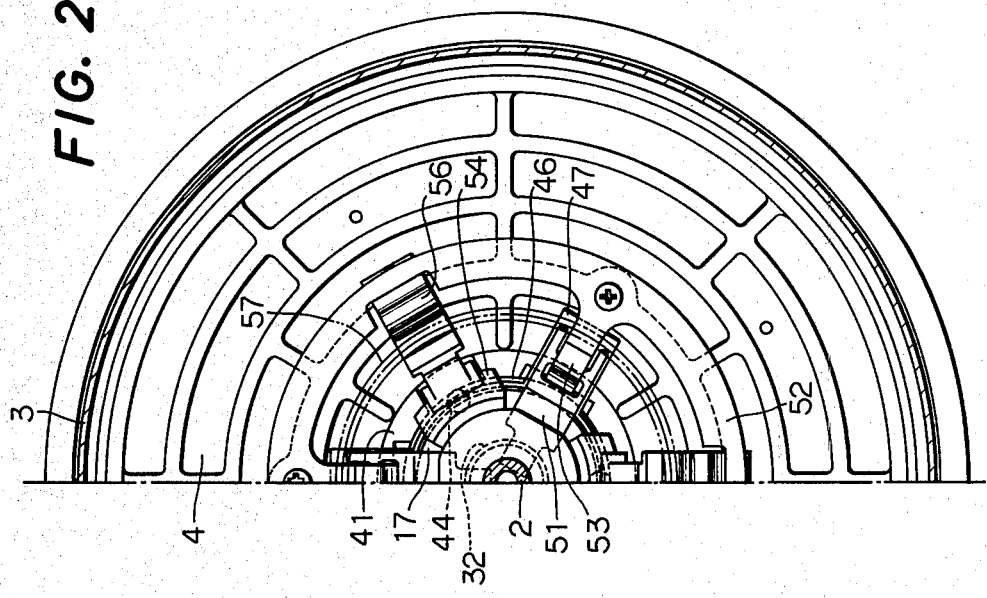

BRAKE BOOSTER

FIELD OF THE INVENTION

This invention relates to a brake booster for boosting brake operational force by utilizing gaseous pressure, and more particularly to an improvement of a stroke-enlarging type brake booster.

BACKGROUND OF THE INVENTION

A stroke-enlarging type brake booster mentioned herein means, as already disclosed in JITSU-KAI-SHO-No. 55 (1980)-22279 (Japanese Utility Model Application laid open to public), one wherein a power piston, which is so disposed in a booster casing as to divide the same into two chambers for being actuated by the pressure difference between the two, is separated from a controlling mechanism for controlling the pressure difference due to an operation of an input member for being relatively movable to the controlling mechanism. This stroke-enlarging type brake booster is featured in obtaining a larger output stroke than the input stroke, while in ordinary brake boosters the output stroke can never be larger than the input stroke.

In a kind of stroke-enlarging type brake boosters the power piston advances independently in the initial stage of the braking operation, and it must be advanced fairly rapidly for getting a better response to the braking operation. So the power piston inevitably hits a control piston, a part of the controlling mechanism, with some speed at the end of the advancing stroke thereof either directly or indirectly via another member. The impact sound produced by the collision of the two pistons is likely to cause the driver anxiety that trouble is happening as well as causing a disagreeable brake feeling due to the shock coming to the brake pedal. Still another disadvantage is the unsmooth brake depressing feeling felt by the driver due to the sudden change of driving force applied to the power piston before and after the collision of the two pistons.

SUMMARY OF THE INVENTION

This invention was made for eliminating the above-mentioned disadvantages, that is, production of impact sound, transmission of collision shock to the brake pedal, and unsmooth brake depressing feeling only by means of adding a few pieces of trifle parts. The essence of this invention resides in attaching a shock-absorbing or buffering member such as of a rubber material to at least one of the abutting surfaces so as to mitigate the impacting force when the abutting takes place for restricting the advancing end of the power piston. The abutting surface referred to herein is either one of the abutting surfaces of the power piston and the control piston when they collide directly with each other; and when the collision takes place with some other member interposed therebetween it means a surface on either the control piston or the other interposed member and on either the other interposed member or the power piston.

In a preferable structure of the brake booster of this invention, the following members are included; (a) a casing, (b) an input member for inputting brake operational force, (c) an output member for outputting boosted force, (d) a power piston so disposed as to divide the interior of the casing into two chambers, constantly biased to a retracted position by spring means, and occasionally advanced by the difference of pressure in the two chambers resisting the spring force of the spring means, (e) a control piston so disposed as to be relatively movable for a pre-limited distance to the power piston, constantly biased to a retracted position by spring means, and occasionally advanced together with the power piston as an integrated body therewith when the pre-limited relatively movable distance has gone out of existence by the advancement of the power piston, (f) a control valve interposed between the control piston and the input member for being actuated by relative movement between the control piston and the input member to control the pressure difference between the two chambers on either side of the power piston, (g) a transmission mechanism for transmitting a force applied by the control piston and the input member, while allowing relative movement between the control piston and the input member, (h) a reaction lever disposed in abutment to the output member at an output portion thereof, a first input portion out of two input portions thereof located on either side of the output portion being in abutment with an output portion of the transmitting mechanism, and a second input portion out of two input portions being in abutment with a member for delivering the output of the power piston, and (i) a shock-absorbing member made of rubber material attached on either one of the abutting surfaces abutting to each other for restricting the end position of the relative forward movement of said power piston to said control piston.

In a brake booster of stroke-enlarging type in accordance with this invention a disagreeable and strange sound, produced when the power piston which is rapidly advanced by a boosting force owing to the pressure difference is abutted, directly or indirectly, with the control piston to be integrated therewith, can be eliminated. At the same time the abutting shock can be prevented from being transmitted back to the brake pedal, and the depressing feeling of the brake pedal can be smooth and comfortable. Furthermore, all of the accompanying anxieties such as making the booster bulky, making the structure complicated, or enlarging the stroke of the input member are effectively prevented in this invention.

BRIEF DESCRIPTION OF THE DRAWINGS

FIG. 2 is a cross sectional view of the embodiment of FIG. 1 taken along the section line II—II (left half is omitted);

FIG. 3 is an enlargement of an essential part in FIG. 1;

FIGS. 4 and 5 are respectively explanatory views for illustrating the operation of the embodiment shown in FIGS. 1 through 3.

DETAILED DESCRIPTION OF THE PREFERRED EMBODIMENT

With reference to the appended drawings a preferred embodiment will be described hereunder in detail for clarifying the objects, structure and effects of this invention.

Figure 1:
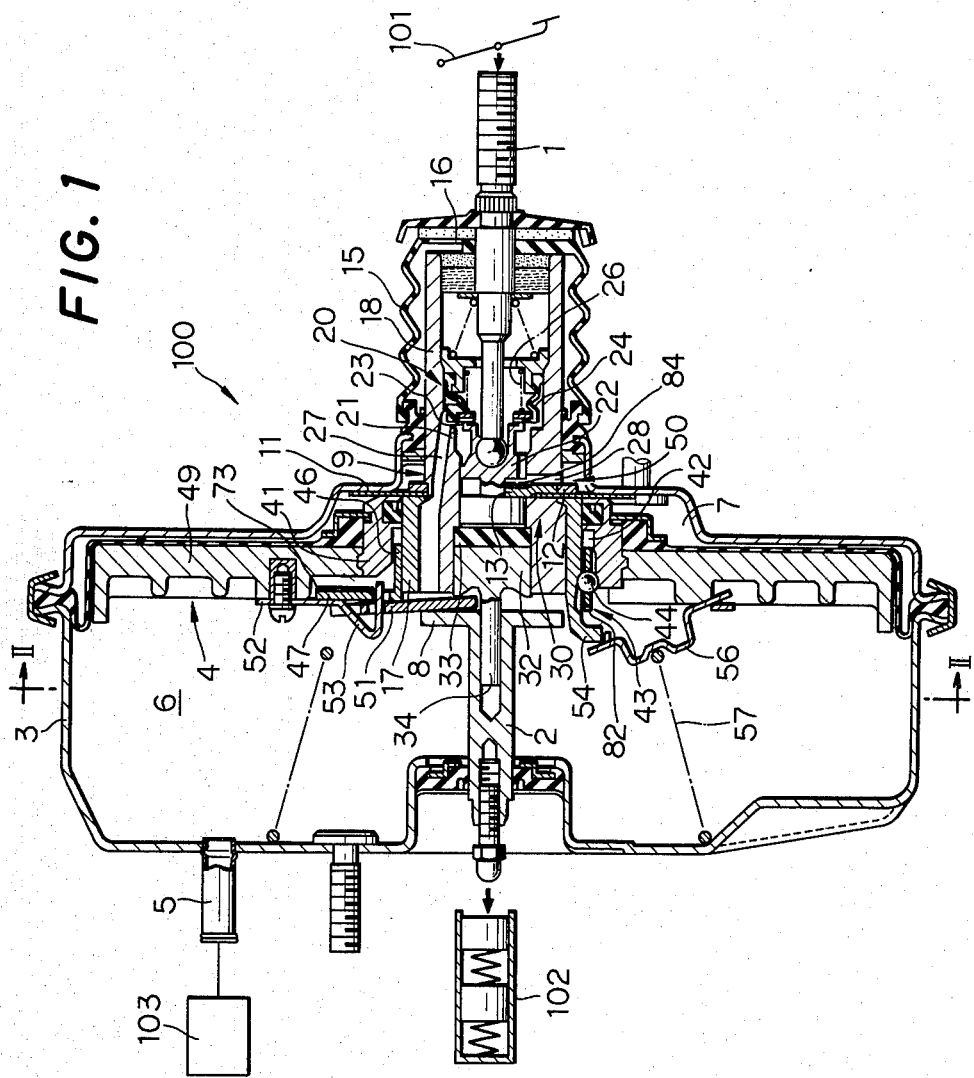
FIG. 1 is an axial sectional view in elevation of an embodiment of a brake booster in accordance with this invention.
Figure 6:
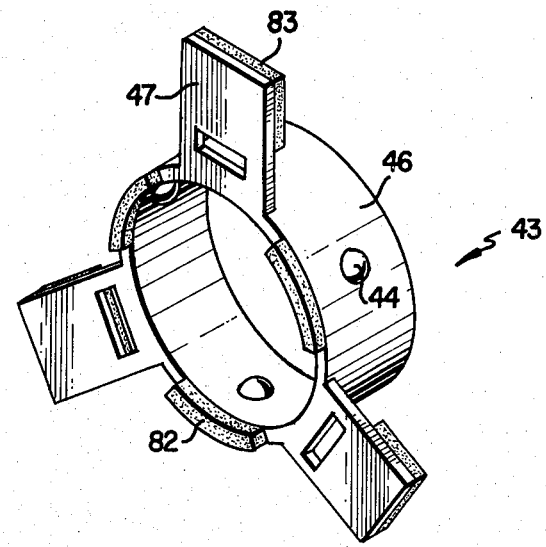
FIG. 6 is a perspective view of our embodiment of a ball retainer in accordance with this invention.

A booster 100 shown in FIG. 1 is to boost an input force applied to an operating rod 1, an input member, before outputting the same from a push rod 2, an output member, to a master cylinder 102.

The booster 100 is provided with an air tight casing 3, whose inside is divided into two chambers by a power piston 4 of diaphragm type. The power piston 4 consists of a body portion 49 and an annular member 41 radially inwardly located. One of the two chambers divided by the power piston 4 constitutes a constant pressure chamber 6 which is under negative pressure, being connected to a vacuum source 103 such as an intake manifold of an engine or a vacuum pump by way of a pipe joint 5. The other chamber is a variable pressure chamber 7 which is variable in pressure by being selectively communicated to the constant pressure chamber 6 or the ambient atmosphere by a later described control valve.

In the middle part of the power piston 4 a controlling mechanism 50 is provided which consists of a control valve 20 (valve mechanism) and a transmission mechanism 30.

In other words, into a central bore of the power piston 4 a control piston 9 composed of a body 18 and a cylindrical member 17 secured on the external side of the body 18 is slidably fitted. The control valve 20 is composed of a first valve seat 21 formed on the control piston 9, a second valve seat 23 formed on a valve plunger 22 slidably fitted in the control piston 9, and a valve element 24 of elastic material disposed commonly to those two valve seats 21, 23. The valve element 24 is biased to both valve seats 21, 23 by the action of a compression spring 26. In the control piston 9 respective air inlet passages 27 and 28 communicating with the constant pressure chamber 6 and the variable pressure chamber 7 are formed. In a groove formed in communication with the air inlet passage 28 and wider than that, a stopper 13 is inserted to restrict the advancing end and the retracting end of the valve plunger 22. An E shape ring 12 prevents removing of the stopper 13 out of the inserted place. On the rear side of the stopper 13 a rubber plate 84 is secured. The E shape ring 12 simultaneously functions to lock a stopper plate 11 which is abuttable on the rear wall of the casing 3 for restricting the retracting end of the control piston 9. A projecting portion of the control piston 9 from the casing 3 is completely covered by a boot 15, whose end portion is provided with an air inlet port 16.

On the other hand, a first transmission mechanism 30 includes the valve plunger 22 fixed on the tip of the operating rod, a large plunger 32 fitted into the control piston 9, and a reaction disc 33 of rubber interposed between the valve plunger 22 and the large plunger 32. The reaction disc 33 functions, while allowing a slight relative movement of the valve plunger 22 and the control piston 9, to transmit the resultant force applied from both to the large plunger 32. The large plunger 32 is provided with a rod portion 34 projecting from the central part thereof for retaining the rear end of the push rod 2.

As shown in FIG. 1 and FIG. 2 (wherein right half only is illustrated because the left half is entirely symmetrical to the former), a circumferential clearance or gap 42 is left between the power piston 4 and the control piston 9 at a counter bore portion formed on the forward side of the power piston 4, wherein a ball retainer 43 for rotatably holding a plurality of balls 44, in this embodiment 3 in number, are accommodated.

More particularly, as illustrated in FIG. 3, on the external peripheral surface of the cylindrical member 17 a ball accommodating recess 61 of annular shape, which is progressively deepened along the forward direction (left side in FIG. 3), is formed. In other words, the bottom of the ball accommodating recess 61 constitutes a tapered surface with a progressively diminished diameter toward the forward (front) end. On the internal surface of the annular member 41, opposed to the ball accommodating recess 61, another recess constituted of a large diametered portion 62 on the forward side, a small diametered portion 63 on the rearward side, and a stepped portion 64 in the middle having an equal curvature to the diameter of the ball 44 is formed.

A ball retainer or second transmission means 43 is composed, as clearly shown in FIG. 2, of a cylindrical portion 46 of thin wall having a radial hole for each ball 44 and three abutting flanges 47 formed outwardly at the right angle. On a forward end surface of the cylindrical portion 46 and on the rear surface of the abutting flanges 47 a thin rubber plate 82 and 83 is respectively secured.

Three reaction levers 51 are interposed respectively between the three abutting flanges 47 and the large plunger 32, and a reaction plate 8 on the rear end of the push rod 2. On the power piston 4 a lever retainer 52, being generally of annular shape, provided with three best pieces 55 extending toward the axis of the power piston 4 is secured. The bent pieces 55 are respectively bent as to form two sides of a triangle from the root to the tip thereof, and is engaged at its root portion with a notch formed at one end portion of each reaction lever 51, and furthermore is fitted at the tip portion thereof into an opening bored in the reaction lever 51 for retaining the same at a fixed position. The bent piece 53 is also abuttable on the abutting flange 47 of the ball retainer 43. And the cylindrical member 17 is provided on the forward end thereof with three outward flanges 54. Between the middle portion of each of three spring receivers 56, which is contacted at one end thereof with the flange 54 and inserted at the other end thereof between the power piston 4 and the lever retainer 52, and the forward wall of the casing 3 at the opposed position to the spring receiver 56, a compression coil spring 57 is spanned.

The operation of this embodiment will be explained hereunder. In a state of non-depressing of a brake pedal 101, the second valve seat 23 is in contact with the valve element 24 while the first valve seat 21 is not. Thus the variable pressure chamber 7 is in communication with the constant pressure chamber 6 so as to maintain both chambers 6, 7 at an equal negative pressure, producing no pressure difference between each side of the power piston 4. Both the power piston 4 and the control piston 9 are under the biasing force from the spring 57 via the spring receiver 56, rendering the stopper plate 11 abutted on the casing 3. The control piston 9 is kept at the retracted position by the abutment of the stopper plate 11 on the casing 3 and the power piston 4 is kept at the retracted position by the abutment on the stopper plate 11 as shown in FIG. 1.

A slight depressing of the brake pedal 101 in this state, with a slight forward advancing of the operating rod 1 (leftward movement in FIG. 1), makes the first valve seat 21 contact the valve element 24 by removing the second valve seat 23 therefrom. The variable pressure chamber 7 will be consequently separated from the constant pressure chamber 6 to be in communication with the ambient atmosphere. Between the constant pressure chamber 6 and the variable pressure chamber 7, where the air comes in from outside, a pressure difference is naturally created so as to push forward the power piston 4.

While the power piston 4 is in advancement, the ball retainer 43 is advanced forwardly by the force coming to the ball 44 via a driving surface, i.e. the surface of the stepped portion 64 of the annular member 41. By the advancing of the ball retainer 43 a force is applied on a second input portion 71 of the reaction lever 51 so as to cause the reaction lever 51 to be rotated by assuming an output portion 75 of the plunger 32, where a first input portion 74 of the reaction lever 51 is in contact as the fulcrum, which results in imparting a driving force to the push rod 2 from a centrally-located output portion 72 of the reaction lever 51 via the reaction plate 8. Due to the driving force, braking fluid in the master cylinder 102 is supplied to the not-shown braking system, with a result of compensating the consumed fluid amount caused by the extinction of the brake clearance and the initial deformation of the piston cup and others. It means a much larger output stroke is obtained than the input stroke applied.

When the braking effect begins to appear due to the going out of existence of the brake clearance the forward end surface of the ball retainer 43 abuts, via the rubber plate 82 thereon, the flanges 54 of the cylindrical member 17 to stop the ball retainer 43 from advancing and the power piston 4 abuts by way of rubber plates 83 the flanges 47 of the ball retainer 43, at a state shown in FIG. 5 and shown with a two-dot-chain line in FIG. 3. It is quite evident that the ball retainer 43 is in this state incapable of moving forwards in relation to the control piston 9, and it is restricted from moving backwards, too. The ball retainer 43 can be moved backwards only corresponding to the outward movement of the balls 44 along the tapered bottom surface of the ball accommodating recess 61. However, the outward movement of the balls 44 is blocked by the ball locking surface, i.e., the internal surface of the small diametered portion 63 of the annular member 41. Both the balls 44 and the ball retainer 43 are thus restricted from moving either forwards or rearwards in relation to the control piston 9.

When the ball retainer 43 has become relatively non-movable to the control piston 9 the operating rod 1 advances, just like in a conventional brake booster, the push rod 2 while the operating rod 1 and the power piston 4 share the load at the ratio determined by both of the reaction lever 51 and the reaction disc 33.

The cylindrical portion 46 of the ball retainer 43 and the power piston 4 are in the above-mentioned operation elastically abutted, via the respective rubber plate 82, 83, on the flanges 54 of the cylindrical member 17 and the flanges 47 of the ball retainer 43 for preventing disagreeable impact sound to be produced when they come to abutment. The shock taking place at the two abutting places can also be prevented from coming back to the brake pedal 102 by way of the control mechanism 50 and the operating rod 1. This phenomenon is largely helpful in preventing a sharply bent or curved performance diagram observed in a graph in the vicinity of bordering area, between the process while the power piston 4 is alone advanced by an assisting or promoting force applied thereon and the process while the power piston 4 and the control piston 9 are advanced in unison, irrespective of the existence of a large variation in the mutual relation between the input and the output in a booster during this transition time. It means, in other words, that the feeling at the brake pedal can be greatly smoothed.

If the brake pedal 101 is, after the limit of the pressure difference on either side of the power piston has been reached, depressed strongly furthermore the first input portion 74 of the reaction lever 51 receives a major force from the output portion 75 of the large plunger 32 to cause the reaction lever 51 to be rotated, assuming the reaction plate 8 as the fulcrum on which the output portion 72 of the reaction lever 51 is abutted, so as to push the ball retainer 43 backwards. At this moment, however, the ball retainer 43 and the balls 44 are as mentioned earlier non-movable in relation to the control piston 9, imparting no force to the power piston 4 in the axial direction. It ensures that the power piston 4 is by no means retracted in relation to the control piston 9 under any pedal depressing force, no matter how large it may be, to give the brake pedal 101 the idle stroke.

As the valve plunger 22 is elastically abutted via the rubber plate 84 on the stopper 13 to be restricted of its forward movement, there is no likelihood of producing a strange or disagreeable sound when it is abutted, nor of transmitting any abutting shock back to the brake pedal 101. After this abutment the operating rod 1, the valve plunger 22, the control piston 9, the large plunger 32, the reaction disc 33, the ball retainer 43, and the reaction lever 51 are all combined into an integral body to advance forward the push rod 2 via the reaction plate 8. The output stroke is increased at this stage in the same amount as the input stroke. Since the assisting force to the power piston 4 has already reached the limit at this moment the output of the booster can never be increased beyond the increase of the brake operational force.

Upon releasing of the depression of the brake pedal 101, the valve element 24 comes to contact with the second valve seat 23, leaving the first valve seat 21, rendering the variable pressure chamber 7 closely sealed by means of its separation from the ambient atmosphere and placing the same in communication with the constant pressure chamber 6 instead (see FIG. 1). No assisting force is applied in this state on the power piston 4. So the power piston is retracted under the biasing force from the spring 57 which comes by way of the spring receiver 56. By this retraction of the power piston 4 the locking of the balls 44 by the small diametered portion 63 is released to return the balls 44 to the state shown with a solid line in FIG. 3, along the reverse process when it was locked. When the ball 44 is not smoothly returned by any chance, it will be forcibly returned through the abutment of the bent pieces 55 of the lever retainer 52 on the flanges 47 of the ball retainer 43.

In this embodiment the control piston 9 and the power piston 4 are mutually abutted with the ball retainer 43 interposed therebetween. And the rubber plates 82 and 83 are respectively attached on the side of the ball retainer 43 between the control piston 9 and the ball retainer 43 as well as between the ball retainer 43 and the power piston 4. Those rubber plates can be, to the contrary, attached on the side of the control piston 9 as well as the power piston 4.

Another type of brake booster, wherein no member such as the ball retainer 43 is interposed between the control piston 9 and the power piston 4, permits the rubber plates to be attached on the abutting surface of either the control piston 9 or the power piston 4.

It goes without saying that modifications and variations can be made for those skilled in the art within the spirit and scope of this invention described in the following claims.

What is claimed is:

1. A brake booster comprising:
   a casing;
   an axially movable input member for receiving an input force;
   an axially movable output member for providing a boosted output force;
   a power piston axially movably received within said casing between said input and output members so as to divide the interior of said casing into two pressure chambers, said power piston being actuated by a pressure difference between said two pressure chambers;
   a control piston axially movable over a predetermined distance relative to said power piston, and advanceable as a unit with said power piston after said predetermined distance of relative movement thereof is achieved through the advancement of said power piston to an advanced position;
   a control valve disposed in association with said input member and said control piston, and actuated by relative movement between said input member and said control piston for controlling said pressure difference;
   first transmission means within said control piston for transmitting forces from said input member and said control piston toward said output member while allowing said relative movement between said input member and said control piston;
   a reaction lever having an intermediate output portion, and first and second input portions on opposite sides of said output portion thereof, said output portion abutting on said output member, and said first input portion abutting on an output portion of said first transmission means;
   second transmission means axially movable for transmitting force from said power piston to said second input portion of said reaction lever as said power piston is advanced relative to said control piston, and for preventing relative movement between said power piston and said control piston after the latter is advanced to its advanced position, said second transmission means abutting first and second abutting portions respectively of said power piston and said control piston so as to define an end limit of said predetermined distance; and
   shock-absorbing means made of resilient material, disposed between said second transmission means and at least one of said first and second abutting portions of said power and control pistons, for reducing noises and impacts occurring therebetween when said power piston is advanced said predetermined distance.

2. A brake booster as recited in claim 1, wherein said second transmission means comprises a cylindrical member axially slidably received between the internal peripheral surface of said power piston and the external peripheral surface of said control piston.

3. A brake booster as recited in claim 2, wherein said cylindrical member of said second transmission means has at least one radial hole, said second transmission means comprises a corresponding number of balls each held in one said radial hole, said external peripheral surface of said control piston comprises first recessed portions each having a progressively increasing depth in the direction of advancement of said power piston, and said internal peripheral surface of said power piston comprises second recessed portions each including a ball driving surface and a ball locking surface, each of said balls engaging said first and second recessed portions such that said ball driving surfaces drive said balls together with said cylindrical member while said power piston is advanced relative to said control piston and such that said ball locking surfaces prevent said balls from radially moving off the bottom surface of said first recessed portions after said power piston is advanced said predetermined distance to the advanced position.

4. A brake booster as recited in claim 2 or 3, wherein said cylindrical member includes a plurality of circumferentially spaced flanges extending radially from one end of said cylindrical member, and said shock-absorbing means comprises first rubber plates attached to said one end of said cylindrical member and second rubber plates attached to said flanges, whereby said one end of said cylindrical member and said flanges abut onto said second and first abutting portions of said control piston and said power piston, respectively, via said first and second rubber plates.

5. A brake booster as recited in claim 1, wherein said control piston has in a central part thereof a stepped bore defined by a large diameter portion and a small diameter portion, and said first transmission means comprises a combination of a small plunger slidably fitted in said small diameter portion and fixed to the inner end of said input member; a large plunger slidably fitted in said large diameter portion and abutting, at said output portion thereof, on said first input portion of said reaction lever; and a reaction disc of rubber material accommodated in a space defined by said large plunger, said small plunger and the surface of said stepped bore.

6. A brake booster as recited in claim 1, wherein said control piston comprises a stopper for restricting the distance of advancement of said small plunger, and another shock-absorbing means interposed between mutually abutting surfaces of said stopper and said small plunger.

* * * * *